Patented Oct. 24, 1939

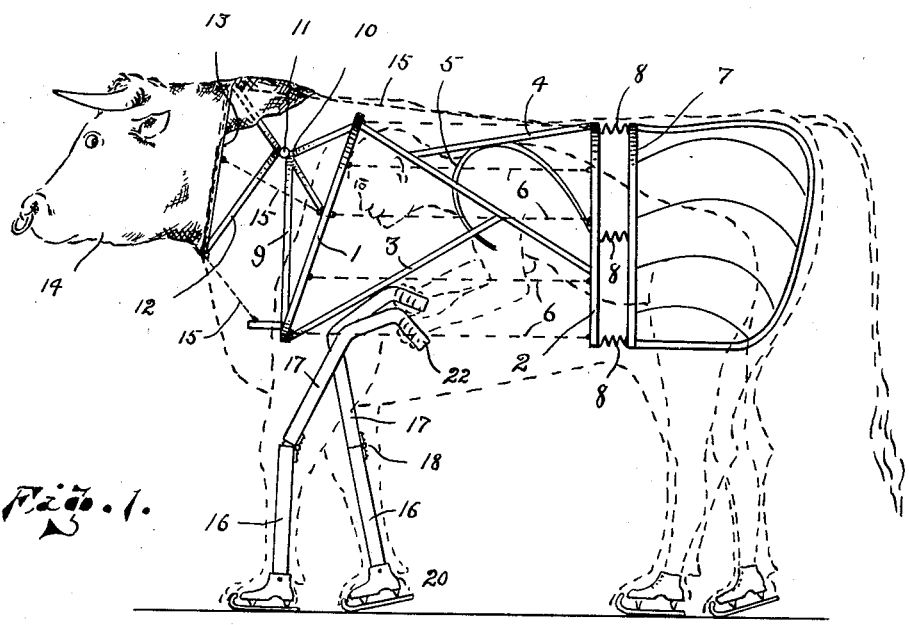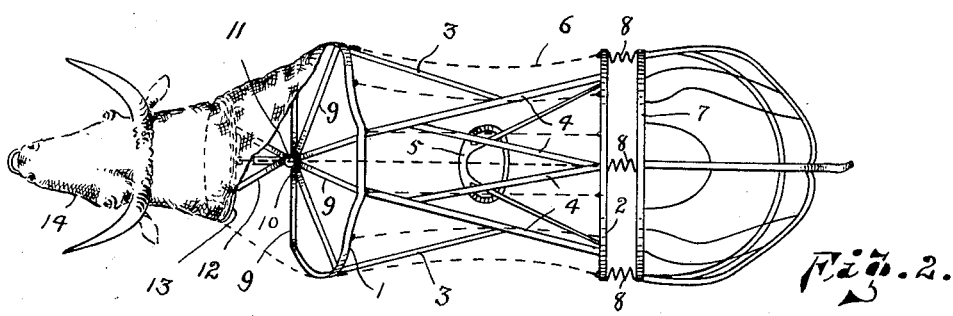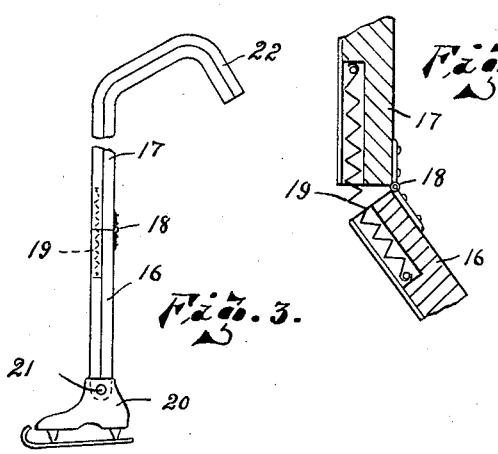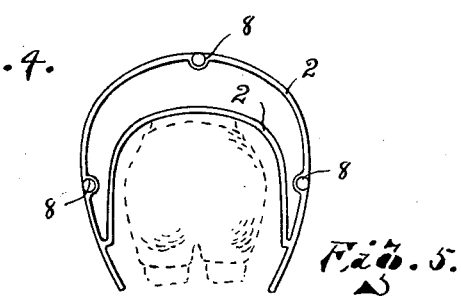

2,176,936

UNITED STATES PATENT OFFICE 2,176,936

ANIMATED ARTIFICIAL ANIMAL

Frank E. Sullivan, Duluth, Minn.

Application April 9, 1938, Serial No. 201,135

8 Claims. (Cl. 272—25)

This invention relates to artificial amusement devices and has special reference to such a device representative of an animal operated and animated monomanually.

The principal object of the invention is to provide simple and convenient mechanism for the support, propulsion, and operation of such a device by a single individual, and wherein the legs of the operator function as legs of the animal.

Another object of the invention is to produce such a creature particularly adapted for exhibition on skates.

Still other objects and advantages of the invention will appear in the following description thereof and more particularly pointed out in the appended claims.

Referring now to the accompanying drawing, forming part of this application, and wherein like reference characters indicate like parts:

Figure 1 is a side elevation of a fabricated structure embodying the invention and designed especially to represent a quadruped, and in which the head and portions of the covering are shown in elevation.

Figure 2 is a top plan view of Figure 1.

Figure 3 is an enlarged side elevation of one of the artificial front legs.

Figure 4 is a still further enlarged fragmental sectional view of the knee joint of one of the front legs.

Figure 5 is an elevation of the rear end of the central body portion of the fabricated body of the animal.

I am aware that artificial animals are somewhat common in the art of entertainment but usually these require the services of two operators, which results in it being almost impossible for harmonious action in producing the life like motion of an animal, and to overcome such obvious disadvantages is another object of the invention.

In the embodiment here illustrated the frame-like structure for the body of the animal is of three resiliently united sections, the central principal supporting portion, the hips and rear end portion, and the neck portion.

The central portion comprises the two arcuately shaped end members 1 and 2, the member 1 being inclined and its upper portion terminating at opposed withers of the beast, and these two members are united as by a series of light metal diagonally disposed bracing members 3—3 and 4—4, the members 4—4 being arranged to act as shoulder supports for the operator, or at least from which any desired form of shoulder and neck support, such as indicated at 5, may be suspended. Along the sides and back of this central body portion may be installed wire or other resilient members indicated at 6 for support of the covering or skin of the animal, and which resilient members may be drawn inwardly as desired to represent the contour of the animal's body.

The front member 7 of the rear section of the body frame is spaced from and attached to the rear member 2 of the central section as by any desired number of helical springs as indicated at 8 so that the union of these members is quite yieldable and susceptible of more or less independent movement. This rear section may be shaped in any desired manner to represent the buttocks and rear end of the animal, and which is clearly illustrated in the drawing. The member 7, however, must correspond in shape to that of the rear member 2 of the central section (see Fig. 5) so as to provide a suitable saddle like archway for the free action of the body and back of the operator, which is illustrated in dotted lines, as his buttocks must be free to function within the rear portion of the body frame and his legs extend downwardly and wrapped about with the legs of the covering member to represent those of the animal.

As a convenient support for the neck and head of the beast, at 9 is illustrated an angularly shaped extension formed as by radially disposed members terminating in the apex 10 where a pivotal or ball joint illustrated at 11 of any desired construction may be installed, and which joint supports in a similar manner the frame 12 carrying the collar member 13 to which the head 14 of the animal is attached. This head preferably is of a more rigid self sustaining construction than the balance of the skin of the animal. From the rear of the collar 13 are guy or sustaining cords illustrated at 15 which are preferably of elastic or spring like formation as desired and which goods may be drawn or attached to sustain the head in as normal a position as possible, though, obviously permitting of its comparatively free universal movement so that as the body of the animal is contorted the head as well as the buttocks will assume more or less life like action.

It will be noted that in this embodiment the operator's head will assume a position substantially below the withers of the animal and below which in front of the shoulders may be installed vision or perforated panels in the skin of the animal for convenience in the operator seeing where he is going, or, in fact, large portions of the skin may be of more or less transparent material without affecting the appearance of the device.

The front legs of the beast are wholly artificial and formed as clearly shown in Figures 3 and 4 of the drawing of an upright rigid member made in two sections 16 and 17 hingedly united as at 18 to provide knee action and in front of which hinge is attached a contractile helical spring 19 causing the members to normally remain in aligned position as in Figure 3 but which will permit of their readily bending when desired by the operator. It will be noted that the artificial foot or shoe, illustrated at 20, is pivotally supported as at 21 to the lower end 16 of the leg, this being to furnish convenience in stopping or other desired manipulation of the front legs.

For convenience in this manipulation the upper portion 17 of each leg is inclined backwardly and then bent at substantially right angles forming a convenient handle 22 to be grasped by the operator when in a stooped position as shown in Figure 1 of the drawing.

Having thus described my invention, what I claim and desire to secure by Letters Patent, is:

1. A property quadruped for entertainment purposes comprising a skeleton body portion to be carried on the back of a human operator when in stooped position, a flexible covering representative of an animal and in which the legs of the operator function as the hind legs of the animal represented, and artificial front legs.

2. A property quadruped for entertainment purposes comprising a skeleton body portion to be carried on the back of a human operator, a flexible covering representative of an animal and in which the legs of the operator function as those of the animal represented, and artificial front legs manipulated directly by the hands of the operator.

3. An animated amusement device representative of a quadruped, comprising a resilient skeleton adapted for support by a human operator, a resilient cover for said skeleton and representative of an animal, hind leg portions of said covering cooperatively engageable with the legs of said operator and artificial front leg portions operable by the hands of the operator.

4. An artificial animal designed to be animated manually, comprising a fabricated yieldable body portion supported by the operator, a fabric cover representative of said animal having depending hind leg portions for cooperation with the legs of the operator and artificial front leg portions operable by the hands of said operator.

5. An artificial animal designed to be animated mono-manually, and wherein the legs of the operator function as one means of propulsion, characterized by the arms of the operator controlling other means to simulate another means of propulsion.

6. An artificial amusement device designed to be displayed on skates monomanually and representing a quadruped, characterized by the legs of the operator acting as the hind legs of the animal and artificial means functioning as the front legs and being manipulated by the hands of the operator.

7. In a fabricated frame-like structure for an artificial quadruped to be operated monomanually, a principal horizontally disposed body portion for engagement over the shoulders and head of the operator while in stooped position, a portion for support of the head of said quadruped pivotally attached to said body portion, and a rear section yieldably attached to the rear of said body portion.

8. In a skating amusement device representing a quadruped, front legs, each comprising a two part hingedly united member, the uppermost part being bent at an angle to the remainder thereof forming a handle therefor for manual manipulation of said legs by the hands of an operator while the lower part pivotally carries an artificial skate-equipped foot, and means for normally holding said two parts in axial alignment.

FRANK E. SULLIVAN.